(12) United States Patent
Matsui et al.

(10) Patent No.: US 7,565,744 B2
(45) Date of Patent: Jul. 28, 2009

(54) METHOD OF MANUFACTURING A MICROPUMP CHECK VALVE

(75) Inventors: Masatomo Matsui, Saijou (JP); Koji Sone, Niihama (JP)

(73) Assignee: Panasonic Corporation, Osaka (JP)

( * ) Notice: Subject to any disclaimer, the term of this patent is extended or adjusted under 35 U.S.C. 154(b) by 749 days.

(21) Appl. No.: 11/033,740

(22) Filed: Jan. 13, 2005

(65) Prior Publication Data

US 2005/0158188 A1 Jul. 21, 2005

(30) Foreign Application Priority Data

Jan. 21, 2004 (JP) ............................. 2004-012514

(51) Int. Cl.
*B21K 1/20* (2006.01)
(52) U.S. Cl. .................... 29/890.131; 137/859; 137/512
(58) Field of Classification Search ............ 29/890.131, 29/890.12, 890.124; 137/859, 512; 417/413.2, 417/413.3
See application file for complete search history.

(56) References Cited

U.S. PATENT DOCUMENTS 5,259,737 A * 11/1993 Kamisuki et al. ............ 417/322
6,620,273 B2 * 9/2003 Dai et al. .................. 156/89.11
2002/0127825 A1 * 9/2002 Mui et al. .................... 438/474

FOREIGN PATENT DOCUMENTS

| JP | 2-308988 | 12/1990 |
| JP | 4-63973 | 2/1992 |
| JP | 2001-12356 | 1/2001 |

* cited by examiner

*Primary Examiner*—David P Bryant
*Assistant Examiner*—Sarang Afzali
(74) *Attorney, Agent, or Firm*—Steptoe & Johnson LLP

(57) ABSTRACT

The invention provides a method capable of manufacturing a micropump check valve, inexpensively and without much trouble or time, which does not cause disadvantages even if a material that dissolves an adhesive is contained in the fluid, and which allows bonding with high accuracy. After a valve forming member and a valve receiving member are bonded, a valve receptor is projected towards a valve part and pretension is applied. Thus, the valve forming member and the valve receiving member can be satisfactorily bonded through a solid phase diffusion bonding method and the like using a relatively inexpensive material, such as stainless steel, without using an adhesive, and the pretension is not reduced when in the annealing state.

6 Claims, 20 Drawing Sheets

METHOD OF MANUFACTURING A MICROPUMP CHECK VALVE

BACKGROUND OF THE INVENTION

1. Field of the Invention

The present invention relates to a micropump serving as a small apparatus for supplying small amounts of fluid used in a fuel cell, medical equipments, a chemical analyzer, a microreactor, a biochemical chip and the like, and particularly relates to a method of manufacturing a check valve for preventing back flow of the fluid in this micropump.

2. Description of the Related Art

In a micropump for delivering small amounts of fluid, a check valve is often used to prevent back flow of the fluid. Under constraints of smallness and thinness, the check valve is required to be configured that a valve part has pretension so as to contact a valve receptor while applying urging force thereto so that the valve part satisfactorily seals the valve receptor to prevent the back flow of the liquid when only a force smaller than a constant pressure is acting.

The following patent documents disclose a mechanism (hereinafter referred to as a pretension mechanism) for applying pretension to a valve part of a check valve.

In the micropump disclosed in JP-A 02-308988, a technique is employed for integrally forming the valve part and a pressurized chamber including the valve part, and performing ultrasonic welding or adhering with an adhesive, the members constituting the valve part and the pressurized chamber, the valve receiving member including the valve receptor, and a vibrating plate vibrated by a piezoelectric element, with respect to each other.

JP-A 04-63973 discloses that in a micropump in which a silicon substrate formed with a diaphragm, a flow path and a valve part is sandwiched from both sides on a glass substrate, a projection made of polymeric material is provided in the valve part of the silicon substrate to apply pretension to the valve part.

JP-A 2001-12356 discloses that a convex part is provided at a central part of a valve part and a ring shaped sealing part is formed at a valve receptor, and when a valve forming member integrally molding the valve part and the valve receiving member formed with the valve receptor are bonded, the convex part of the valve part and the ring shaped sealing part are contacted to each other while being applied with pretension, in order to stabilize the mechanism for preventing back flow in the micropump.

However, in the micropump shown in JP-A 02-308988 in which each members (members constituting the valve part and the pressurized chamber, a valve receiving member bonded with the valve part with pressure, and a vibrating plate vibrated by a piezoelectric element) constituting the micropump are ultrasonically bonded with respect to each other, the bonding precision is low since the base material is only partially dissolved. Further, in the case that each members are adhered using an adhesive, if a component for dissolving the adhesive such as alcohol is contained in a fluid supplied by the micropump, the adhesive is threatened to dissolve into the fluid, thereby changing the properties of the components of the fluid, or stripping off the adhered portions. Further, the adhesive may remain at the interface between the adhered parts during adhesion thus worsening the flow of the fluid. Furthermore, since the adhered region during adherence is unstable, bonding with high accuracy cannot be achieved.

Additionally, in the micropump shown in JP-A 04-63973, when providing the projection of polymeric material at the valve part of the substrate made of silicon, it is required to perform dry etching on the silicon substrate and form the projection by screen printing in an aligned condition with high accuracy, which is troublesome and time consuming because of the complicated steps. Moreover, since the dry etching apparatus is expensive and the silicon material itself is expensive, the manufacturing cost becomes extremely high.

In the micropump shown in JP-A 2001-12356, when manufacturing such micropump, it is impossible to form the convex part or the ring shaped sealing part after bonding the valve forming member and the valve receiving member. Thus, it is required to provide the convex part at the central part of the valve part of the valve forming member in advance, form the ring shaped sealing part at the valve receptor in advance, and thereafter bond the valve forming member and the valve receiving member. As such bonding method, bonding the valve forming material and the valve receiving member under high temperature by a method like diffusion bonding may be conceived, but with such method, a problem arises that tension may be lost in the annealed state. Therefore, in order to prevent the problem, it is required to perform bonding using adhesive under a relatively low temperature or bonding at a limited bonding region excluding the portion provided with pretension, which is, however, followed by another problem that when using the adhesive, the adhesive dissolves into the fluid, the adhered portion may be stripped off, and the flow of the fluid worsens. Further, when bonding is performed for a limited bonding region, the diffusion bonding method cannot be employed, thus necessitating the use of ultrasonic welding or laser welding, which causes a problem to arise that distortion occurs at the border between the bonded portion and the non-bonded region, rendering it impossible to perform bonding with high accuracy.

SUMMARY OF THE INVENTION

The present invention aims to provide a method of manufacturing a micropump check valve, inexpensively and without much trouble or time, which solves the above problems, which does not cause disadvantages even if a material that dissolves an adhesive is contained in the fluid, and which allows bonding with high accuracy.

The present invention for solving the above problems is a method of manufacturing a micropump check valve arranged in a flow path for flowing a fluid by pressure change, wherein the method comprises forming a valve part in a valve forming member, forming a flow path hole for such fluid in a valve receiving member including a valve receptor for receiving the valve part, bonding the valve forming member and the valve receiving member with the valve part of the valve forming member facing the valve receptor of the valve receiving member, and pressurizing and projecting the valve receptor towards the valve part from the side away from the valve part after bonding, and contacting the valve part to the valve receptor while applying urging force.

According to this method, after the valve forming member and the valve receiving member are bonded, the valve receptor is projected towards the valve part side and pretension (urging force) is applied, and thus the valve forming member and the valve receiving member can be satisfactorily bonded through a solid phase diffusion bonding method using a relatively inexpensive material, such as stainless steel, without using an adhesive, and reduction of pretension when in the annealing state does not occur.

In this case, it is suitable to constitute the valve forming member and the valve receiving member with the same material, or to bond the valve forming material and the valve receiving material by a solid phase diffusion bonding method. By constituting with the same material, bonding can be performed extremely satisfactorily with the solid phase diffusion bonding method, and electrolytic etching that occurs when bonding different types of metal does not occur. Further, by performing pressurization by pressing process, the process of applying pretension can be carried out easily and satisfactorily.

Additionally, by forming a depression on at least one of a location facing a supporting part of the valve part and a part of the valve receptor in the valve receiving member, or by interposing a spacer material between the valve forming member and the valve receiving member, so that at least one of the valve part and the supporting part is spaced apart from the valve receiving member during bonding. Thus, the valve part and the supporting part thereof can be reliably prevented from fixing to the valve receiving member during bonding, while still satisfactorily bonding the valve forming member and the valve receiving member, thereby further enhancing reliability.

According to the present invention, after bonding the valve forming member and the valve receiving member, the valve receptor is projected towards the valve part side and pretension is applied, so that the valve forming member and the valve receiving member can be satisfactorily bonded by a solid phase diffusion bonding method and the like using a relatively inexpensive material such as stainless steel without using an adhesive. Thus, dissolving of adhesive and stripping off of adhered portions do not occur, unlike the case where adhesive is used. Further, reduction of pretension does not occur in the annealing state, so that the valve part contacts the valve receptor in a state where pretension has been applied satisfactorily, thereby enhancing reliability.

BRIEF DESCRIPTION OF THE DRAWINGS

FIG. 1A is a view showing the micropump in a stationary state, FIG. 1B is a view showing a state in which a piezoelectric element is deformed upwards and a fluid is introduced into a pressure chamber, and FIG. 1C is a view showing a state in which the piezoelectric element is deformed downwards and the fluid is discharged from the pressure chamber;

FIG. 3A is a cross sectional view showing a plate material subjected to valve formation and flow path hole formation, FIG. 3B is a cross sectional view showing a state in which bonding is performed, and FIG. 3C is a cross sectional view showing a state in which pressurization is performed;

FIGS. 4A and 4B are a plan view and a cross sectional view of first and sixth plate materials, FIGS. 4C and 4D are a plan view and a cross sectional view of second and fifth plate materials, and FIGS. 4E and 4F are a plan view and a cross sectional view of third and fourth plate materials;

FIG. 6A is a cross sectional view showing a plate material subjected to valve formation and flow path hole formation, FIG. 6B is a cross sectional view showing a state in which bonding is performed, and FIG. 6C is a cross sectional view showing a state in which pressurization is performed;

FIGS. 7A and 7B are a plane view and a cross sectional view of first and sixth plate materials, FIGS. 7C and 7D are a plan view and a cross sectional view of second and fifth plate materials, and FIGS. 7E and 7F are a plan view and a cross sectional view of third and fourth plate materials;

FIG. 10A is a cross sectional view showing a plate material subjected to valve formation and flow path hole formation, FIG. 10B is a cross sectional view showing a state in which bonding is performed, and FIG. 10C is a cross sectional view showing a state in which pressurization is performed;

FIGS. 11A and 11B are a plan view and a cross sectional view of second and fifth plate materials, and FIGS. 11C and 11D are a plan view and a cross sectional view of a third plate material;

FIG. 12A is a cross sectional view showing a plate material subjected to valve formation and flow path hole formation, FIG. 12B is a cross sectional view showing a state in which bonding is performed; and FIG. 12C is a cross sectional view showing a state in which pressurization is performed;

FIGS. 13A and 13B are a plane view and a cross sectional view of second and fifth plate materials, and FIGS. 13C and 13D are a plan view and a cross sectional view of a third plate material; FIG. 14A is a cross sectional view showing a plate material subjected to valve formation and flow path hole formation, FIG. 14B is a cross sectional view showing a state in which bonding is performed, and FIG. 14C is a cross sectional view showing a state in which pressurization is performed.

DESCRIPTION OF THE PREFERRED EMBODIMENTS

Figure 1A:
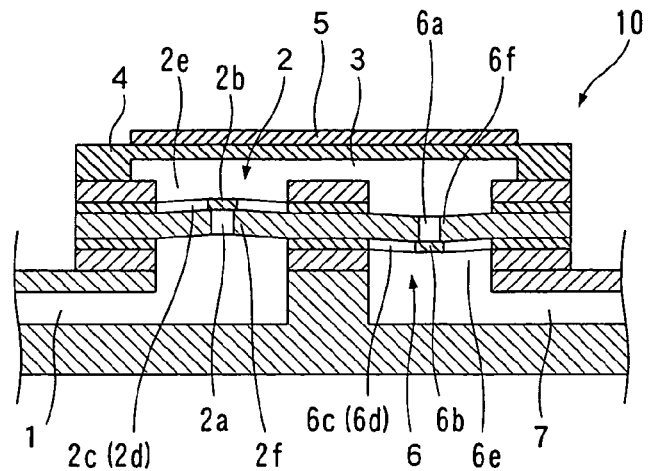
FIGS. 1A to 1C are cross sectional views respectively explaining the liquid-supply principle of a micropump including a check valve according to an embodiment of the present invention, where

A method of manufacturing a micropump check valve according to the embodiments of the present invention will now be described in detail based on the figures.

First, the micropump check valve manufactured by the method of manufacturing micropump check valve according to a first embodiment of the present invention, and a configuration of the micropump using such check valve will be explained using FIG. 1 and FIG. 2.

As shown in FIG. 1, the micropump 10 includes an inflow path 1 for introducing fluid (e.g., alcohol) gas or a mixture of the above to be delivered, a suction side check valve 2 arranged connected to the inflow path 1, a pressure chamber 3 into which the fluid from the inflow path 1 flows by way of the suction side check valve 2, a vibrating plate 4 vibrated to apply pressure to the pressure chamber 3, a piezoelectric element 5 for vibrating the vibrating plate 4, a discharge side check valve 6 arranged and connected to the pressure chamber 3, and an outflow path 7 for discharging the fluid from the pressure chamber 3 by way of the discharge side check valve 6. Here, the suction side check valve 2 and the discharge side check valve 6 are arranged facing opposite sides with respect to the pressure chamber 3, but the configuration itself is the same.

Figure 2A:
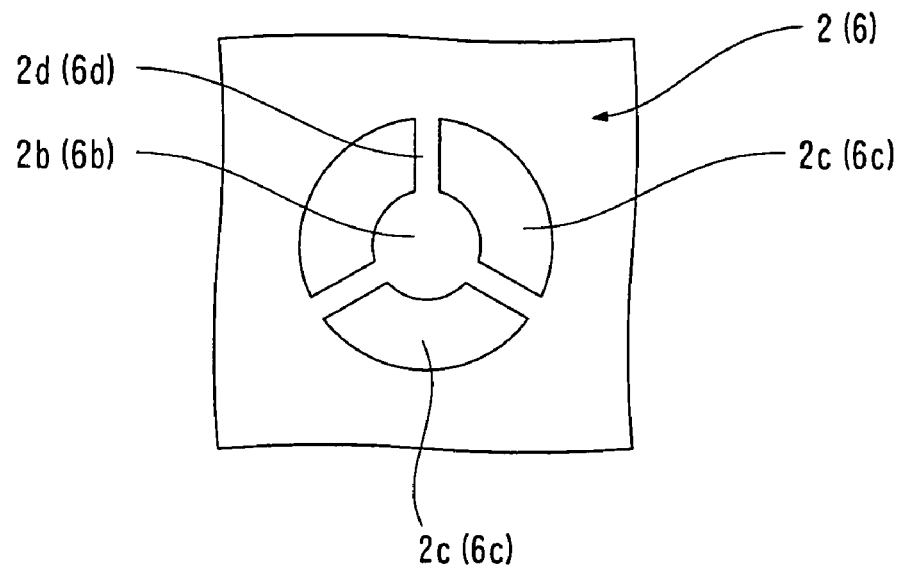
FIGS. 2A and 2B are plan views respectively showing a valve part and the like of the micropump check valve.
Figure 2B:
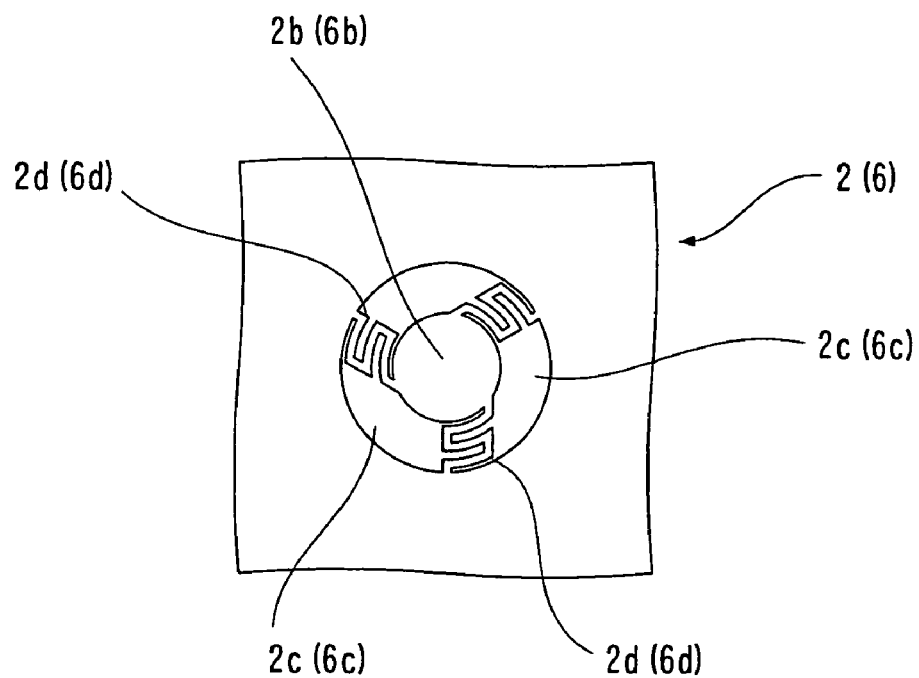

As shown in FIG. 1A and FIG. 2A, the check valves 2 and 6 are configured from small-bore-inlet holes 2a and 6a for introducing the fluid, valve parts 2b and 6b formed to a size corresponding to the inlet holes 2a and 6a and arranged so as to cover the inlet holes 2a and 6a, valve receptors 2f and 6f acting as external periphery walls of the inlet holes 2a and 6a for receiving the valve parts 2b and 6b, large-bore passing holes 2c and 6c formed on the external periphery of the valve parts 2b and 6b, arm-shaped supporting parts 2d and 6d formed so as to bridge across the large-bore passing holes 2c and 6c to support the valve parts 2b and 6b, and outlet holes 2e and 6e formed so as to correspond to the large-bore passing holes 2c and 6c to flow out the fluid passing through the large-bore passing holes 2c and 6c. The valve receptors 2f and 6f (refer to FIG. 1A) are formed into a shape projecting towards the downstream side of the flow direction, and are contacted to the valve parts 2b and 6b in the pre-load state in which pretension is applied in a state where the external force is not acting. Here, the supporting parts 2d and 6d for supporting the valve parts 2b and 6b may, instead of forming the large-bore passing holes 2c and 6c into a shape bridging across in a straight line along the radial direction as shown in FIG. 2A, form the large-bore passing holes 2c and 6c into a shape bridging across in a meandering form with respect to the radial direction as shown in FIG. 2B and in such case, when making the displacement of the amount of valve lift the same by the same external force, the radius of the large-bore passing holes 2c and 6c is shortened compared to when forming the large-bore passing holes 2c and 6c into a shape bridging across in a straight line along the radial direction (FIG. 2A) and thus the volume of the pressure chamber 3 is reduced.

The liquid-supplying principle of the micropump will now be explained with reference FIG. 1A to FIG. 1C. FIG. 1A shows a state in which the micropump is stationary. In this state, as mentioned above, the valve parts 2b and 6b contact the valve receptors 2f and 6f in a pre-load state in which pretension is applied.

Figure 1B:
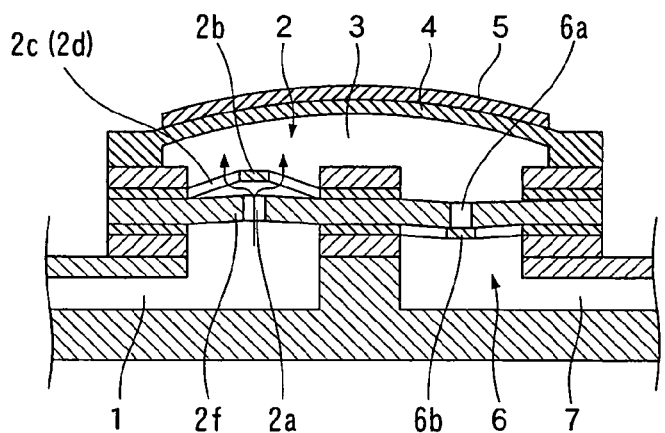

In such state, when the piezoelectric element 5 is electrically conducted thereby curving the vibrating plate 4 as shown in FIG. 1B, the volume within the pressure chamber 3 increases, and thus the inside of the pressure chamber 3 instantaneously becomes a negative pressure, and a pressure difference between the upstream side and the downstream side is created with locations of check valves 2 and 6 as the boundary. As a result, at the suction side check valve 2 in which the valve part 2b is displaceable towards the side of the pressure chamber 3, the supporting part 2d deforms and the valve part 2b moves towards the side of the pressure chamber 3. Thus, a gap forms between the valve receptor 2f and the valve part 2b, and the fluid flows into the pressure chamber 3 through the passing hole 2c. When the fluid flows into the pressure chamber 3, the negative pressure is relieved, and the pressure difference between the upstream side and the downstream side of the suction side check valve 2 gradually disappears, and thus when the pressure difference becomes small, the valve part 2b returns to a position contacting the valve receptor 2f of the external periphery of the inlet hole 2a, and the flow path closes.

Figure 1C:
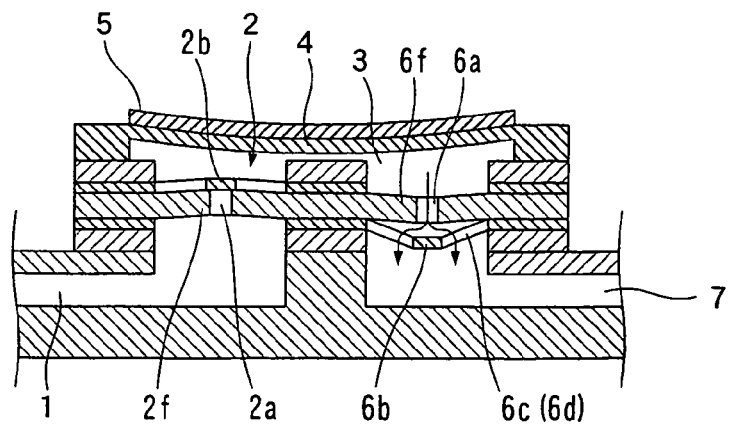

Thereafter, when the piezoelectric element 5 is electrically conducted in the opposite direction thereby curving the vibrating plate 4 towards the opposite side as shown in FIG. 1C, the volume of the pressure chamber 3 decreases, and thus the inside of the pressure chamber 3 instantaneously becomes a pressurized state, and a pressure difference between the upstream side and the downstream side is created with the locations of the check valves 2 and 6 as the boundary. As a result, at the discharge side check valve 6 in which the valve part 6b is displaceable towards the side away from the pressure chamber 3, the supporting part 6d deforms and the valve part 6b moves towards the side away from the pressure chamber 3. Thus, a gap is formed between the valve receptor 6f and the valve part 6b, and fluid flows into the outflow path 7 through the passing hole 6c. When the fluid is discharged to the outflow path 7 and the pressurized state is relieved, the pressure difference between the upstream side and the downstream side of the discharge side check valve 6 gradually disappears, and at the point where the pressure difference becomes small, the valve part 6b returns to the position contacting the valve receptor 6f, as shown in FIG. 1A, by pretension, and the flow path closes.

Therefore, by repeating the movement from the state shown in FIG. 1A through the state shown in FIG. 1B and FIG. 1C back to the state shown in FIG. 1A, the fluid is delivered from the inflow path 1 to the outflow path 7 by way of the suction side check valve 2, the pressure chamber 3, and the discharge side check valve 6.

The method of manufacturing the check valves 2 and 6 used in the above micropump 10 will now be explained.

Figure 3A:
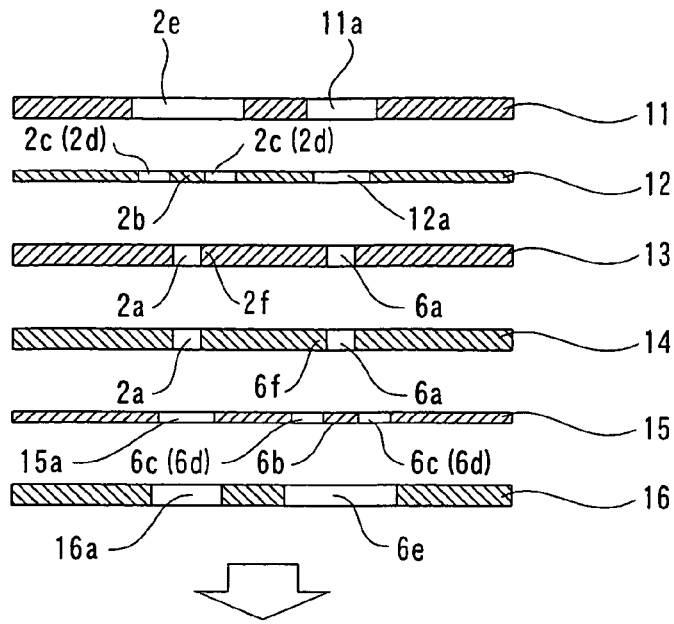
FIGS. 3A to 3C are cross sectional views respectively showing each step of a method of manufacturing a micropump check valve according to a first embodiment of the present invention, where
Figure 3B:
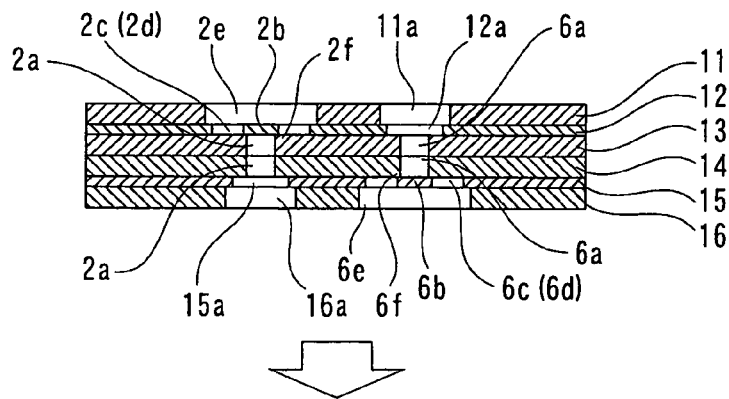
Figure 3C:
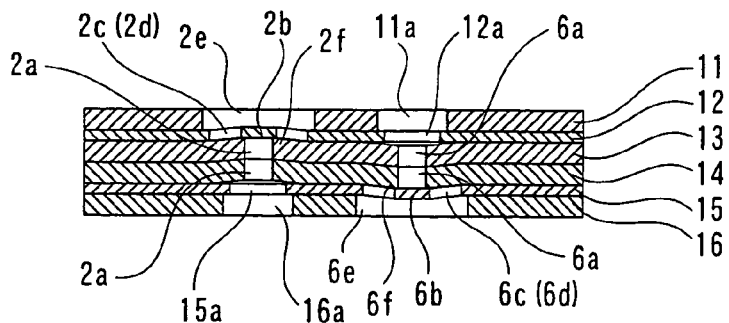

FIG. 3 shows check valves 2 and 6 configured by laminating first to sixth stainless steel plate members 11 to 16 in the vertical direction. Here, the second plate member 12 second from the top in FIG. 3 functions as the valve forming member of the suction side check valve 2 formed with the valve part 2b, the third plate member 13 functions as the valve receiving member formed with the valve receptor 2f for receiving valve part 2b of the suction side check valve 2, the fourth plate member 14 functions as the valve receiving member formed with the valve receptor 6f for receiving the valve part 6b of the discharge side check valve 6, and the fifth plate member 15 functions as the valve forming member of the discharge side check valve 6 formed with the valve part 6b.

In the manufacturing steps of the check valves 2 and 6, the valve parts 2b and 6b and the flow path holes of the fluid are formed on the first to the sixth plate members 11 to 16, as shown in FIGS. 3A, and FIGS. 4A to 4F.

Figure 4A:
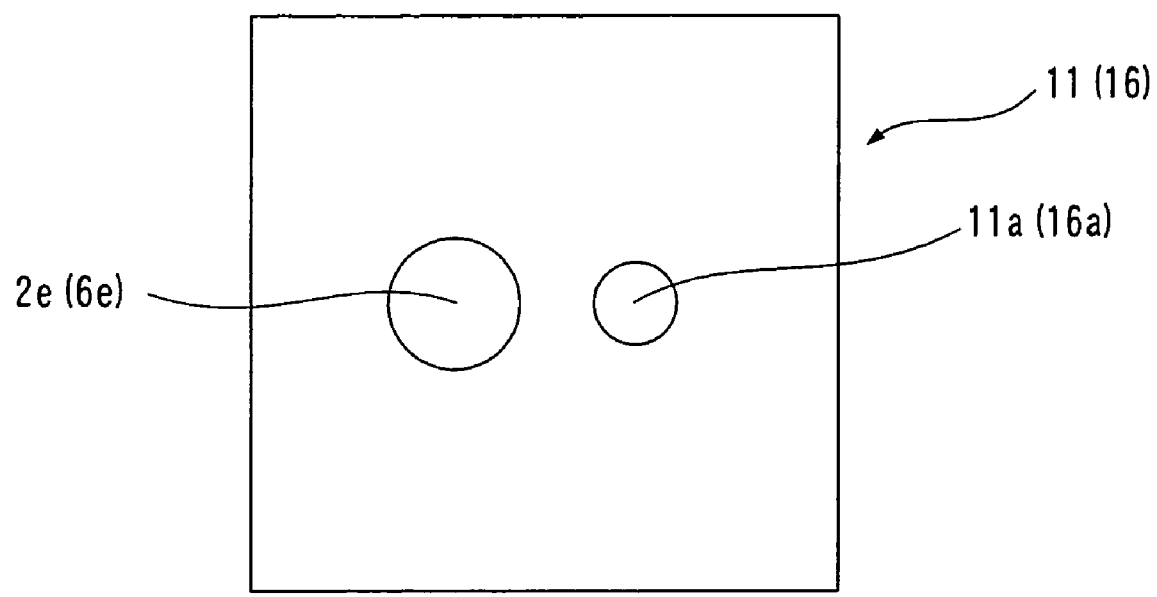
FIGS. 4A to 4F are plan views and cross sectional views respectively showing a plate material of the micropump check valve, where
Figure 4B:
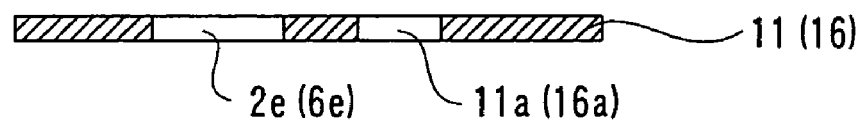

As shown in FIGS. 4A and 4B, the outlet hole 2e of the suction side check valve 2 as well as a communicating hole 11a for communicating the pressure chamber 3 and the inlet hole 6a of the discharge side check valve 6 are formed on the first plate member 11. Here, the communicating hole 11a of the first plate member 11 is formed to a size corresponding to the diameter of a punch indenter 50 of a pressing device to be hereinafter described.

Figure 4C:
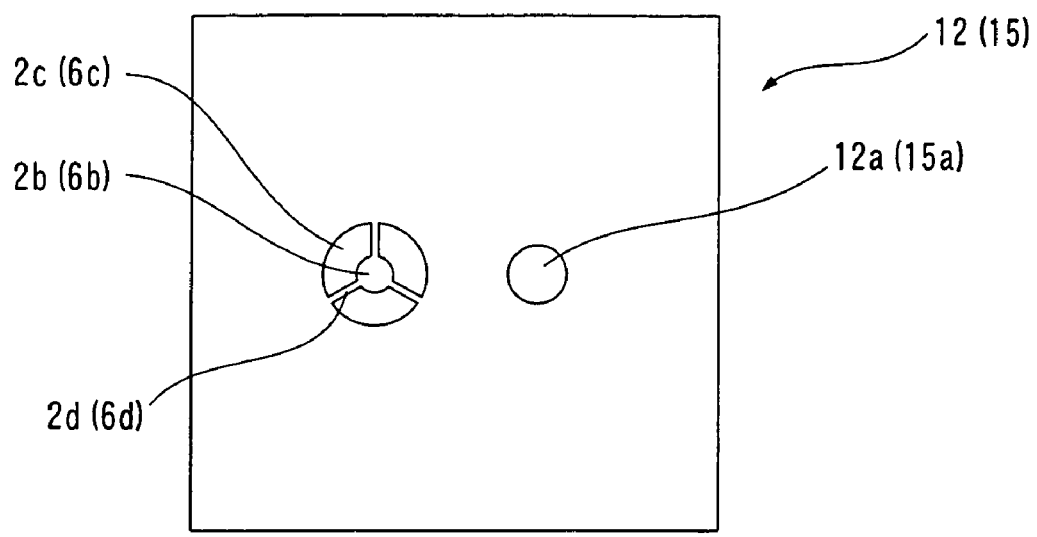
Figure 4D:
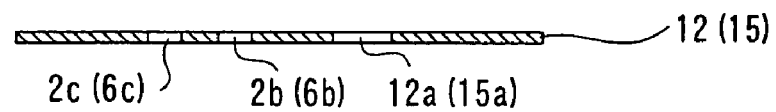

As shown in FIGS. 4C and 4D, the valve part 2b, the passing hole 2c and the supporting part 2d of the suction side check valve 2 as well as a communicating hole 12a for communicating the communicating hole 11a of the first plate material 11 and the inlet hole 6a of the discharge side check valve 6 are formed on the second plate material 12 serving as the valve forming member of the suction side check valve 2. Here, the communicating hole 12a of the second plate material 12 has a diameter slightly smaller than the communicating hole 11a of the first plate material 11, but larger than the inlet hole 6a provided in the third plate material 13 to be hereinafter described so as to satisfactorily introduce the fluid to the inlet hole 6a.

Figure 4E:
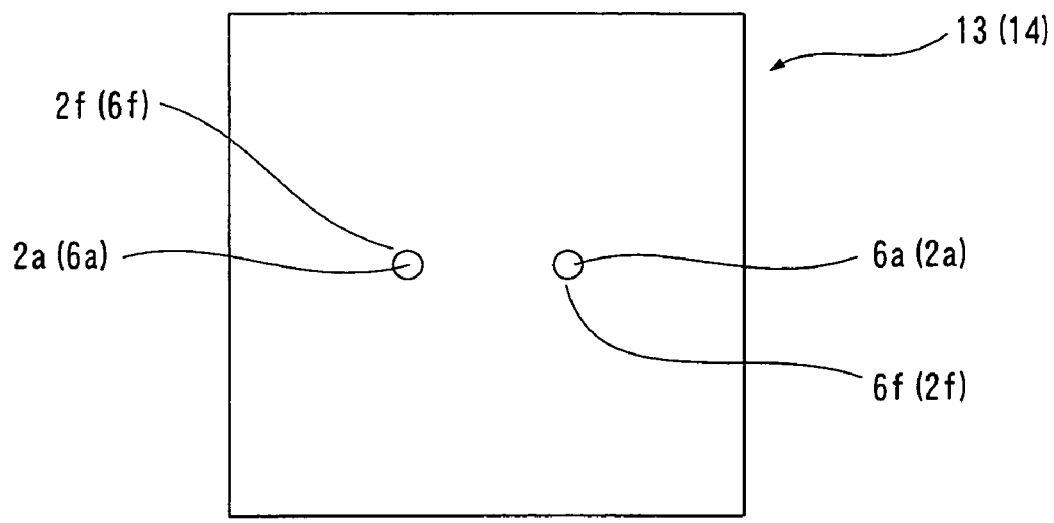
Figure 4F:
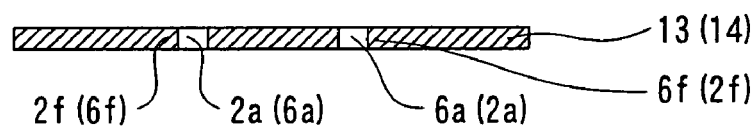

As shown in FIGS. 4E and 4F, the inlet holes 2a and 6a of the check valves 2 and 6 are each formed on the third plate material 13 functioning as the valve receiving member of the suction side check valve 2, and the fourth plate member 14 functioning as the valve receiving member of the discharge side check valve 6. The inlet holes 2a and 6a are formed with a diameter slightly smaller than the valve parts 2b and 6b so as to be satisfactorily closed by the valve parts 2b and 6b. Further, the external peripheral wall parts of the inlet holes 2a and 6a function as valve receptors 2f and 6f for receiving the valve parts 2b and 6b. Further, the third plate material 13 and the fourth plate material 14 are formed into the same shape.

As shown in FIGS. 4C and 4D, a communicating hole 15a for communicating the inflow path 1 and the inlet hole 2a of the suction side check valve 2 as well as the valve part 6b, the passing hole 6c and the supporting part 6d of the discharge side check valve 6 are formed on the fifth plate material 15 serving as the valve forming member of the discharge side check valve 6. Note that the fifth plate material 15 is formed into the same shape as the second plate material 12, but reversed left to right, and in practice, configured using a configuration having the shape same as the second plate material 12 in the reversed direction.

As shown in FIGS. 4A and 4B, a communicating hole 16a for communicating the inflow path 1 and the inlet hole 2a of the suction side check valve 2, and the communicating hole 15a of the fifth plate material 15 as well as the outlet hole 6e of the discharge side check valve 6 are formed on the sixth plate material 16. Here, the communicating hole 16a of the sixth plate material 16 is formed into a size corresponding to the diameter of the punch indenter 50 of the pressing device to be hereinafter described. Note that the sixth plate material 16 is formed into the same shape as the first plate material 11, but reversed left to right, and in practice, configured using a configuration having the shape same as the first plate material 11 in the reversed direction.

As shown in FIG. 3B, the first to sixth plate materials 11 to 16 are laminated in the vertical direction, and bonded by solid phase diffusion bonding method. More specifically, the first to the sixth plate materials 11 to 16 are laminated so that the valve part 2b, 6b of the check valve 2, 6 face the inlet hole 2a, 6a serving as flow path holes in the valve receiving members (third and fourth plate materials 13 and 14), and held over a predetermined time (e.g., 1 hour) at high temperature atmosphere (e.g., 950° C.) with a predetermined pressure (e.g., 1 to 10 MPa) applied from above and below. The materials of the first to the sixth plate materials 11 to 16 are thereby directly bonded together by crystal (crystal grain). Here, the solid diffusion bonding method is generally a method of sealing the base materials, pressurizing the same under a temperature condition equal to or less than the melting point of the base material to an extent not creating plastic deformation and using the diffusion of atoms produced at the bonding interface for bonding, and in such method, even when the insert material is used between the bonding base materials, neither the melting material nor the insert material are dissolved. This method is a well known method among those skilled in the art.

During the bonding, the first to the sixth plate materials 11 to 16 are pressurized from both sides in a sealed manner without space in the vertical direction at locations on the external periphery side from the passing hole 6c of the check valve 2, 6 at each surface where each plate material 11 to 16 is laminated, and thus the contacting surfaces of the first to the sixth plate materials 11 to 16 are satisfactorily bonded together. On the other hand, at locations that become the supporting parts 2d and 6d or valve parts 2b and 6b of the check valves 2 and 6 in the second and the fifth plate materials 12 and 15 or the valve forming members, the valve receptors 2f and 6f and the vicinity thereof in the third and the fourth plate materials 13 and 14 serving as valve receiving members are contacted but the surface opposite thereof has space, and thus the pressurizing force is extremely small. and thus can be formed so as to barely bond by adjusting the pressurizing force to a predetermined pressure.

Figure 5A:
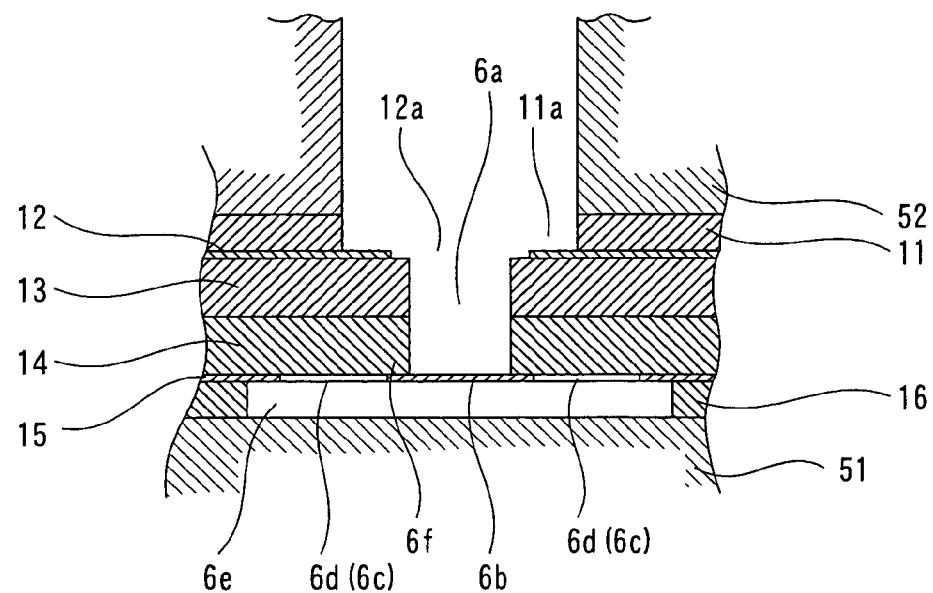
FIGS. 5A and 5B are cross sectional views respectively showing a pressurizing of the method of manufacturing the micropump check valve.
Figure 5B:
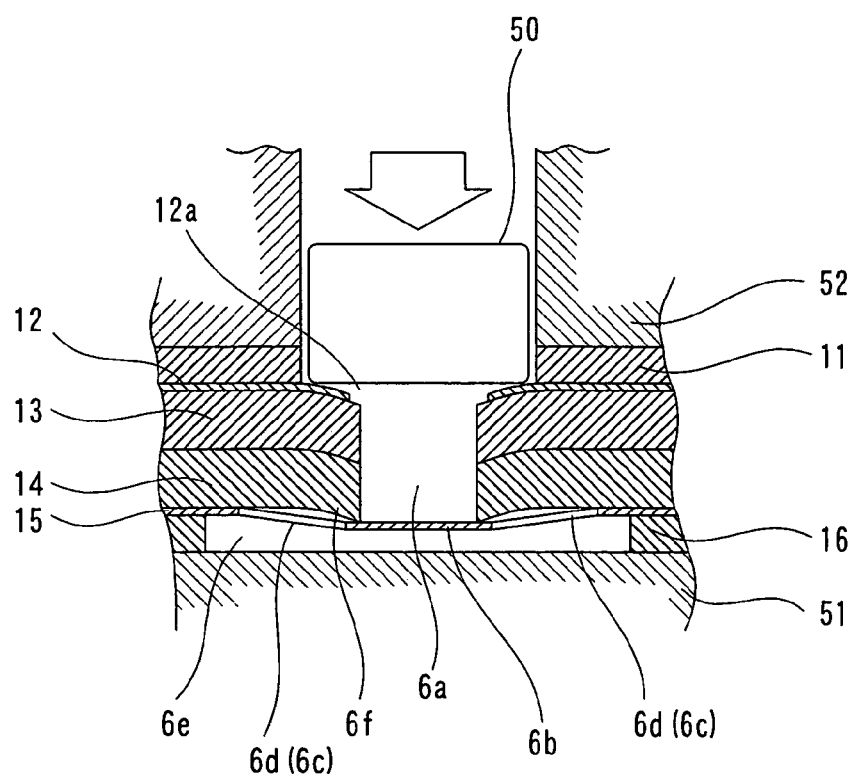

Subsequently, after returning the first to the sixth plate materials 11 to 16 laminated and bonded as above to a state in which the pressurizing force is not acting in a normal room temperature atmosphere, the valve receptors 2f and 6f (external periphery wall of inlet holes 2a and 6a) of the third and the fourth plate materials 13 and 14 serving as valve receiving members are pressurized to project towards the valve parts 2b and 6b from the side away from the valve parts 2b and 6b, and deformed so as to contact the valve parts 2b and 6b of the suction side check valve 2 and the discharge side check valve 6 while applying urging force, as shown in FIGS. 5A and 5B. Herein, FIGS. 5A and 5B show the step of pressurizing the check valve 6 on the discharge side.

As shown in FIGS. 5A and 5B, for example, the sixth plate material 16 is arranged on a lower frame 51 of the pressing device and the upper frame 52 of the pressing device is arranged on the first plate material 11 to fix the first to the sixth plate members 11 to 16 by sandwiching from above and bottom. The punch indenter 50 of the pressing device is contacted to the external periphery wall of the passing hole 12a in the second plate material 12 from above in this state and pressed so as to be pushed down by a predetermined displacement amount (e.g., 5 to 50 μm). As a result, the external periphery wall portions of the inlet hole 6a of the discharge side check valve 6 in the third and the fourth plate materials 13 and 14 deform so to as to project downward in a substantially conical shape, and further, the supporting part 6d and the valve part 6b of the fifth plate material 15 also deform so as to project downward in a substantially conical shape. The valve part 6b of the fifth plate material 15 contacts the valve receptor 6f of the fourth plate material 14 with pretension (urging force) applied by the reactive force of being pushed down.

Thereafter, the first to the sixth plate materials 11 to 16 are turned upside down, and similarly, the press indenter 50 of the pressing device is contacted to the external periphery of the passing hole 15a in the fifth plate material 15 from above and is pressed so as to be pushed down. Thus, the valve part 2b of the second plate material 12 contacts the valve receptor 2f (peripheral wall of inlet hole 2a) of the third plate material 13 while applying pretension (urging force).

The first to the sixth plate materials 11 to 16 are thereby bonded together in an extremely satisfactory manner, and since a method of deforming the valve receptors 2f and 6f of the check valves 2 and 6 to apply pretension to the valve parts 2b and 6b is used after bonding, reduction of pretension when in the annealing stage does not occur, and a satisfactory reliability as check valves 2 and 6 is obtained. When bonding task is performed after pressing process, the valve parts 2b and 6b of the check valves 2 and 6 are sometimes fixed to the valve receptors 2f and 6f, but such disadvantage does not occur according to the above method. Further, since adhesive is not used, even when the fluid, the subject to be supplied, contains solvent (e.g., alcohol) that dissolves adhesive, the bonding state is satisfactorily maintained. By using the solid phase diffusion bonding method, bonding is performed with high accuracy at an extremely high density. Further, by using stainless material as material of check valves 2 and 6, the material cost becomes inexpensive, and by configuring with the same material, an extremely satisfactory bonding is performed by the solid phase diffusion bonding method, and there is no possibility of causing electrolytic etching as when bonding different types of metal. Moreover, by performing the pressurizing by pressing process, the process of applying pretension can be performed easily and satisfactorily.

Figure 6A:
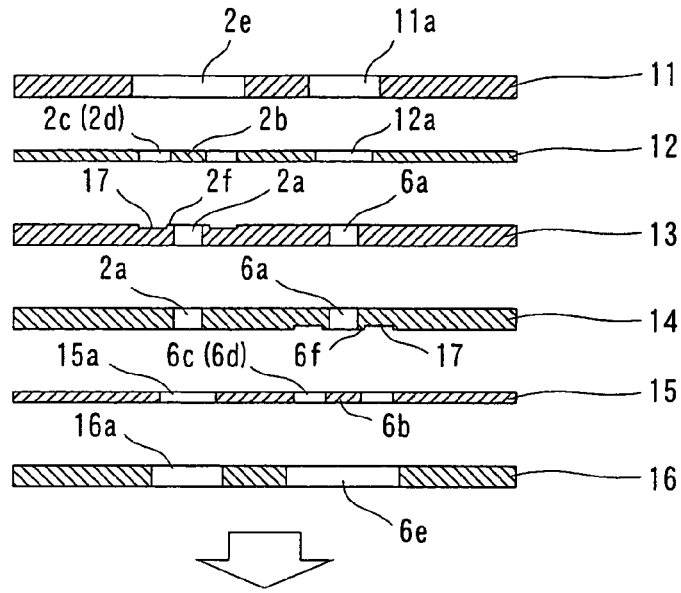
FIGS. 6A to 6C are cross sectional views respectively showing each step of a method of manufacturing a micropump check valve according to a second embodiment of the present invention, where
Figure 6B:
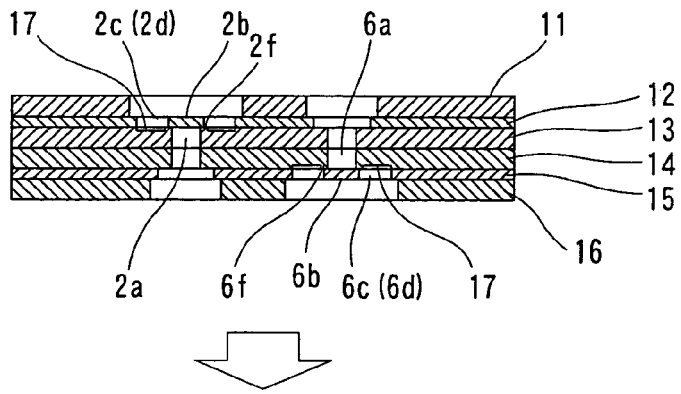
Figure 6C:
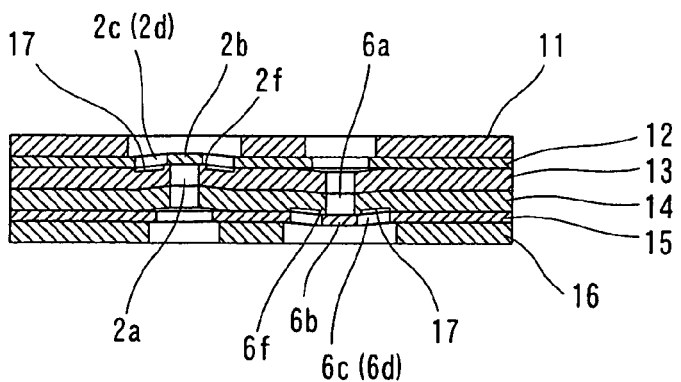
Figure 7A:
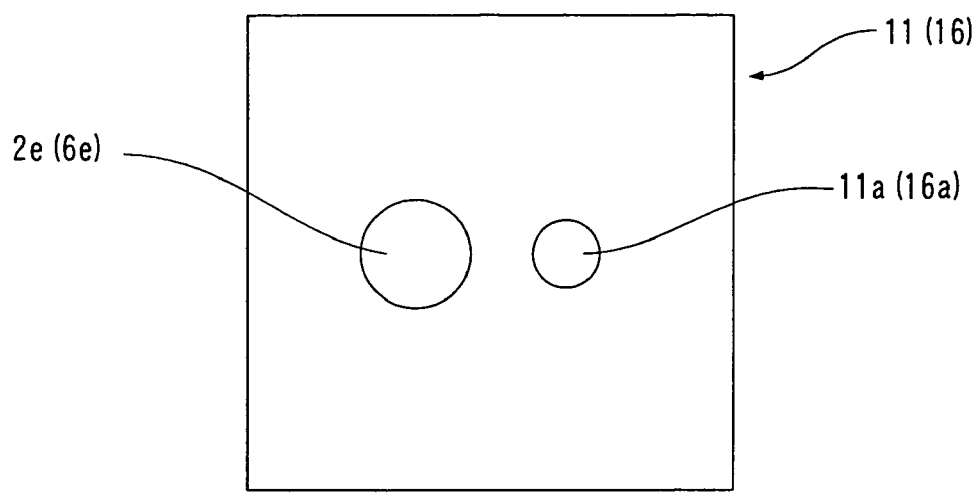
FIGS. 7A to 7F are plan views and cross sectional views respectively showing a plate material of the micropump check valve, where
Figure 7B:
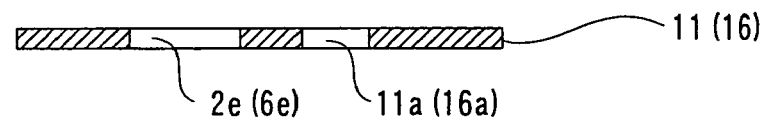
Figure 7C:
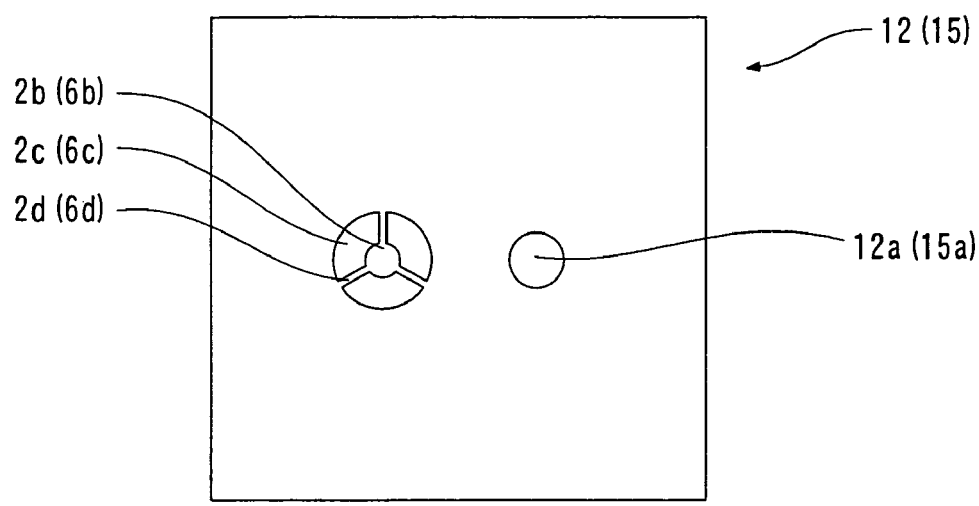
Figure 7D:
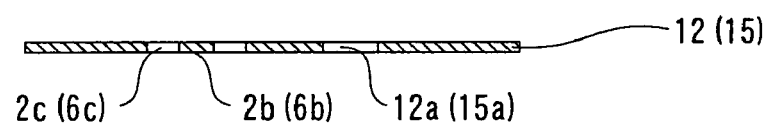
Figure 7E:
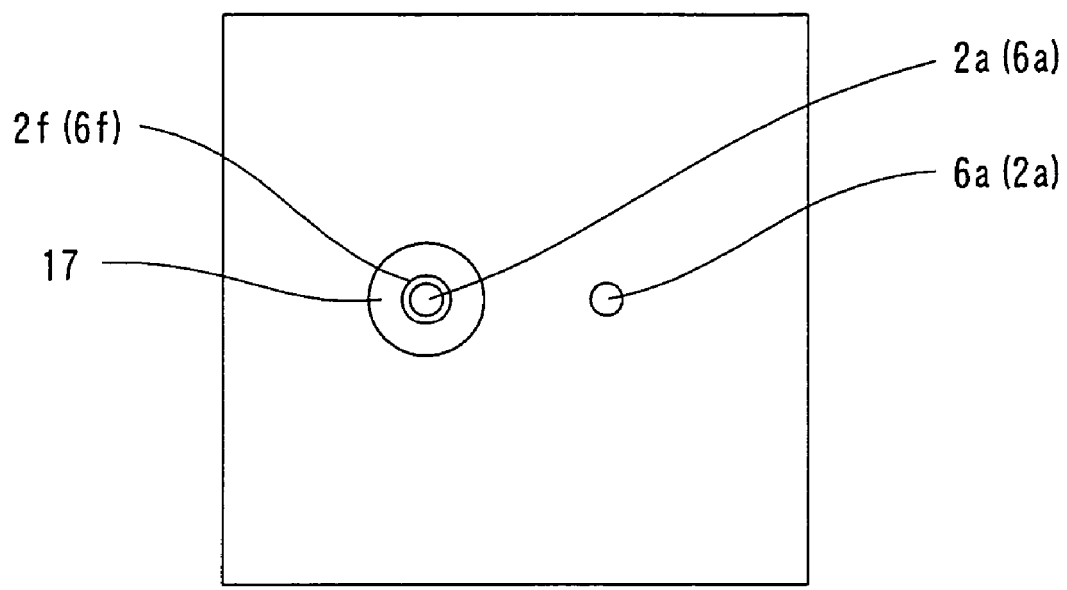
Figure 7F:
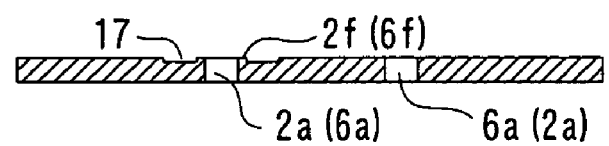
Figure 8A:
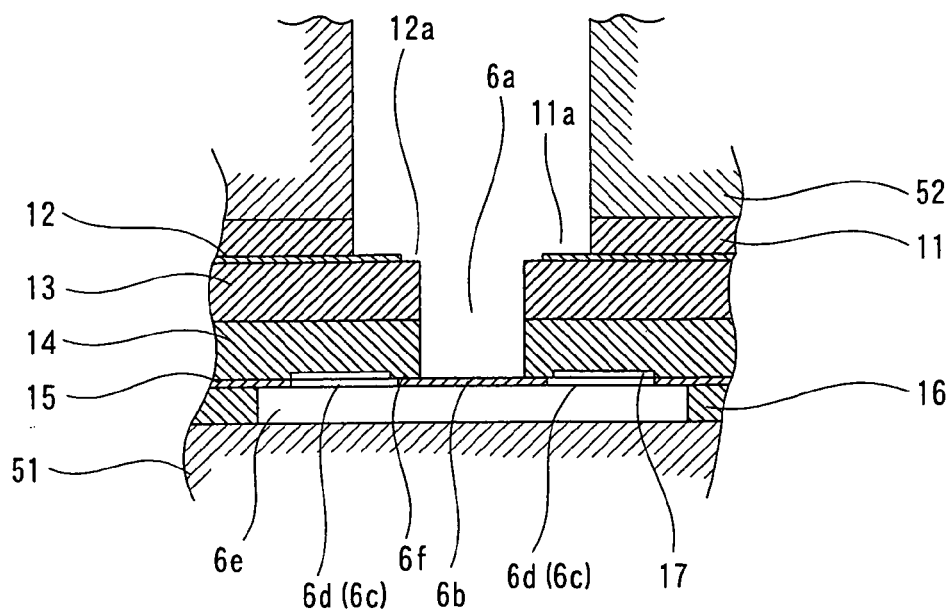
FIGS. 8A and 8B are cross sectional views respectively showing a pressurizing of the method of manufacturing the micropump check valve.
Figure 8B:
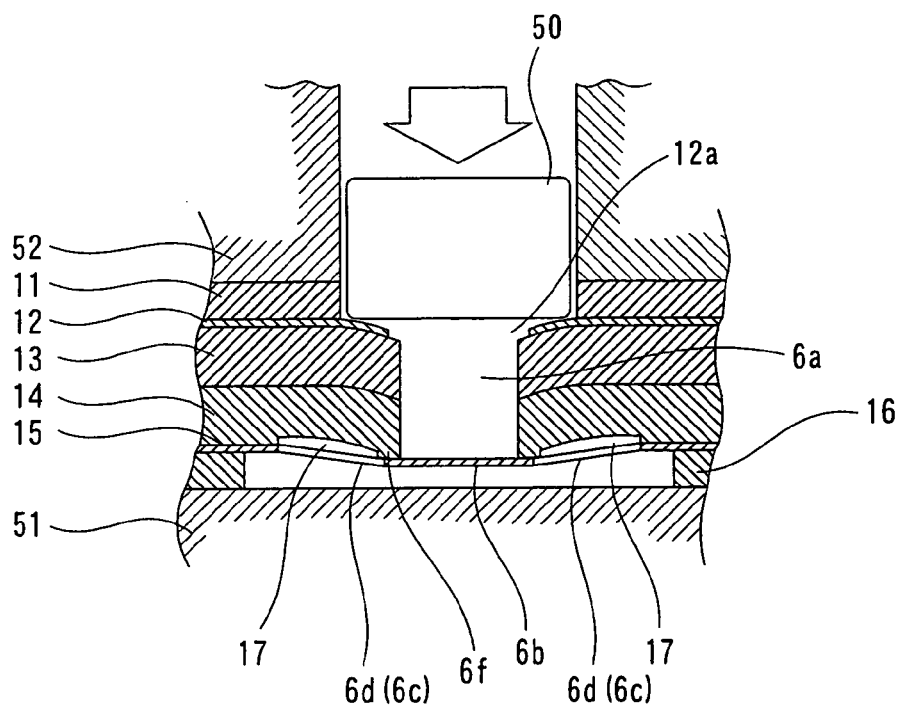

FIGS. 6 to 8 show a second embodiment of the present invention. As shown in FIGS. 6A, 6B, 7E, and 7F, in the second embodiment, in a step of forming each plate materials 11 to 16, a depression 17 is formed in advance at locations facing the supporting parts 2d and 6d of the valve parts 2b and 6b in the third and the fourth plate materials 13 and 14 serving as valve receiving members, that is at locations at the external periphery of the valve receptors 2f and 6f by half etching. During the bonding, the first to the sixth plate materials 11 to 16 are bonded together with the locations formed with the depression 17 in the third and fourth plate materials 13 and 14, that is, the locations of the external periphery of the valve receptors 2f and 6f, and the supporting parts 2d and 6d of the valve parts 2b and 6b of the second and the fifth plate materials 12 and 16 spaced apart by the depression 17.

As such, during the bonding, the fixing of the supporting parts 2d and 6d of the valve parts 2b and 6b to the locations at the external periphery of the valve receptors 2f and 6f is reliably prevented by forming the depression 17, while satisfactorily bonding the first to the sixth plate materials 11 to 16 including the valve forming member and the valve receiving member to each other, thereby further enhancing reliability.

In other words, in the bonding, the first to the sixth plate materials 11 to 16 are laminated, and a predetermined pressure is applied from above and bottom under a high-temperature atmosphere, but in such case in the above first embodiment, the pressure from above and bottom acts on the external periphery part of the check valves 2 and 6, and the valve parts 2b and 6b as well as the supporting parts 2d and 6d thereof contact the valve receiving parts (valve receptors 2f and 6f and external periphery locations thereof), and thus the supporting parts 2d and 6d to which the pressure from above and bottom is easily conducted from the external periphery side fix to the external periphery locations of the valve receptors 2f and 6f depending on the pressurizing condition, and when fixed, the movement of the valve parts 2b and 6b becomes unsatisfactory. On the contrary, by forming the depression by half etching and the like at locations facing the supporting parts 2d and 6d of the valve parts 2b and 6b in the third and the fourth plate materials 13 and 14 serving as valve receiving members, as mentioned above, the locations formed with the depression 17 in the bonding are spaced apart from the supporting parts 2d and 6d of the valve parts 2b and 6b, and thus the fixing of such location is reliably prevented.

Here, the depression 17 may be formed not only at locations facing the supporting parts 2d and 6d in the third and fourth plate materials 13 and 14 serving as valve receiving members but also at valve receptors 2f and 6f, in which case, the push-out amount of the second to the fifth plate materials 12 to 15 by the punch indenter 50 of the pressing device in the subsequent pressurizing is set larger than the thickness dimension of the depression 17. Thus, the valve receptors 2f and 6f contact the valve parts 2b and 6b while applying pretension. Further, the depression 17 may be formed only at valve receptors 2f and 6f, in which case as well, the fixing of the valve parts 2b and 6b and the valve receptors 2f and 6f is prevented compared to when depression 17 is not formed, thereby enhancing reliability.

Figure 9A:
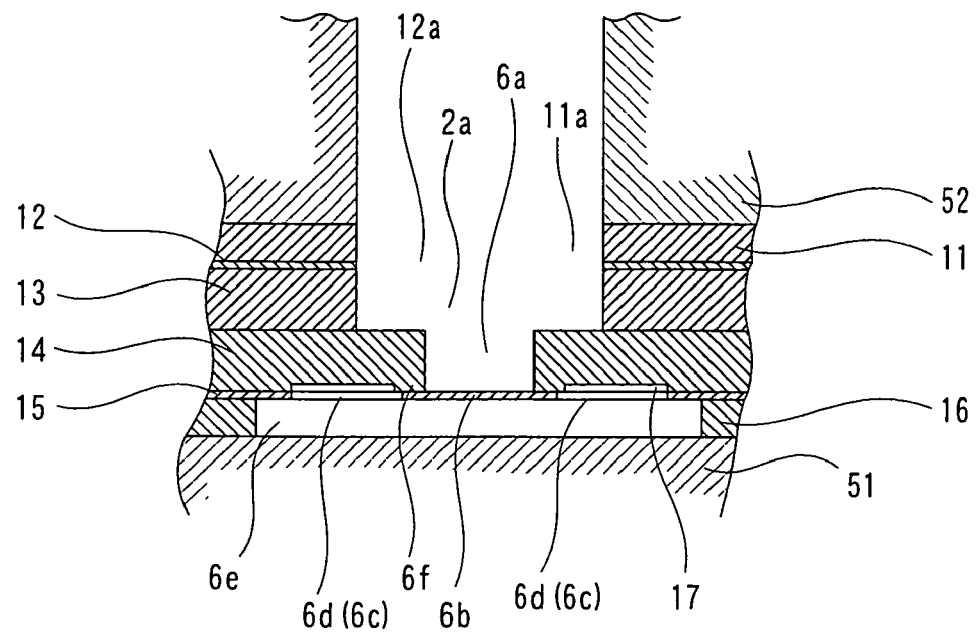
FIGS. 9A and 9B are cross sectional views respectively showing each step of a method of manufacturing a micropump check valve according to a third embodiment of the present invention.
Figure 9B:
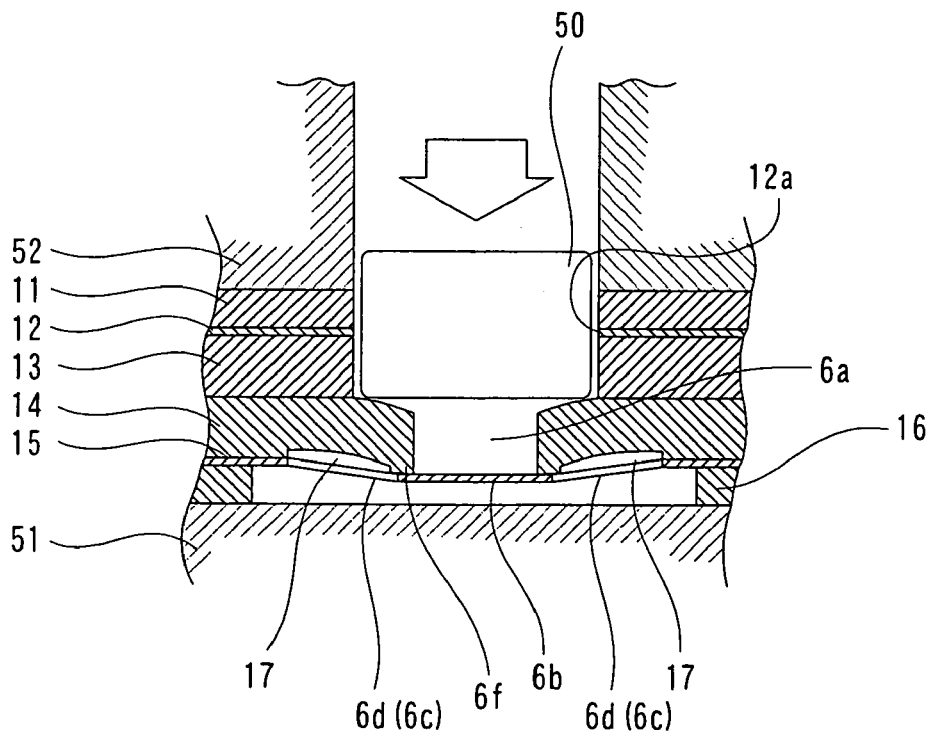

As in a third embodiment shown in FIG. 9, the hole 2a of the valve receiving member on the side distant from the check valves 2 and 6 may also be formed in accordance with the diameter of the punch indenter 50 so as to push out only one valve receiving member by the punch indenter 50 of the pressing device, in which case, the number and thickness of the plate materials to be deformed by the pressing process are reduced, and thus has an advantage of making the pressing force by the punch indenter 50 of the pressing device small and using an inexpensive pressing device.

Figure 10A:
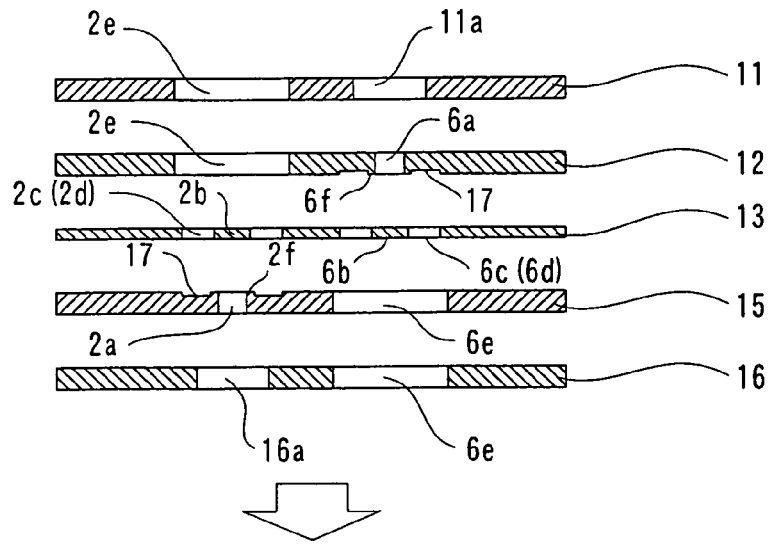
FIGS. 10A to 10C are cross sectional views respectively showing each step of a method of manufacturing a micropump check valve according to a fourth embodiment of the present invention, where
Figure 10B:
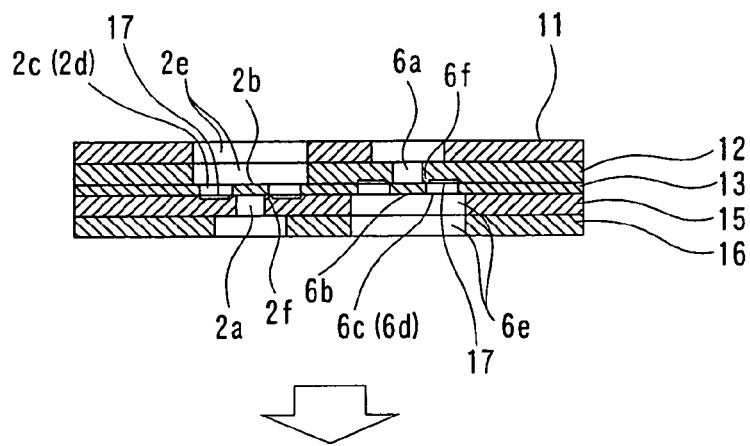
Figure 10C:
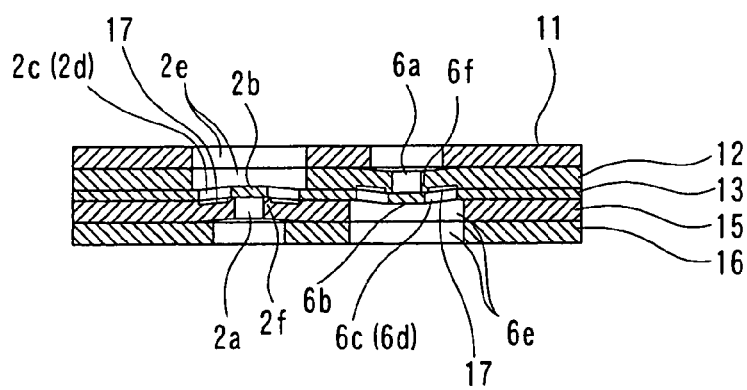
Figure 11A:
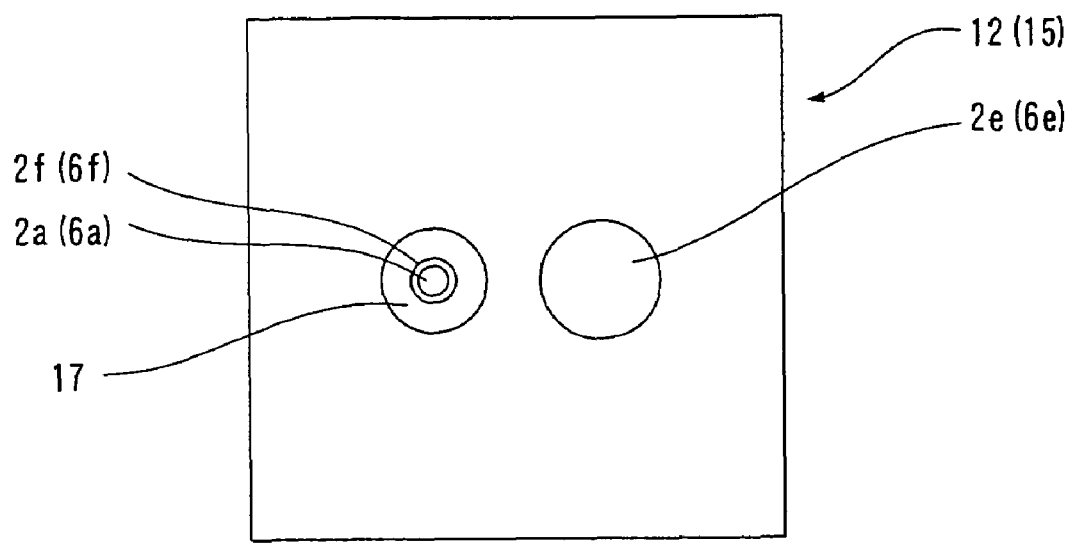
FIGS. 11A to 11D are plan views and cross sectional views respectively showing the plate material of the micropump check valve, where
Figure 11B:
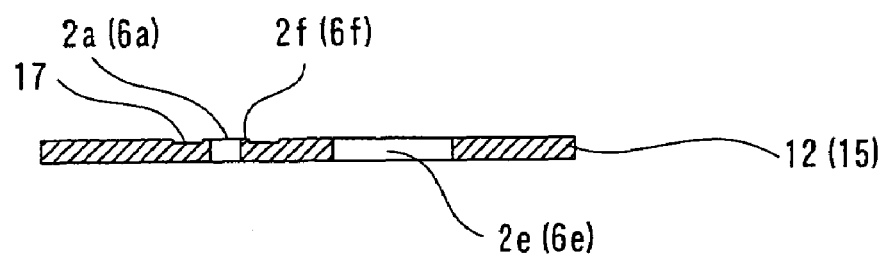
Figure 11C:
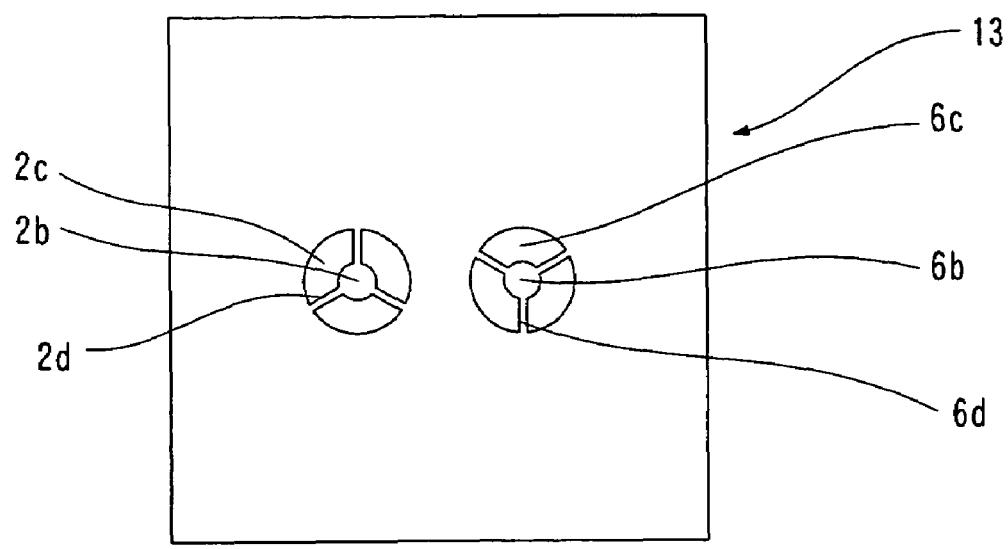
Figure 11D:
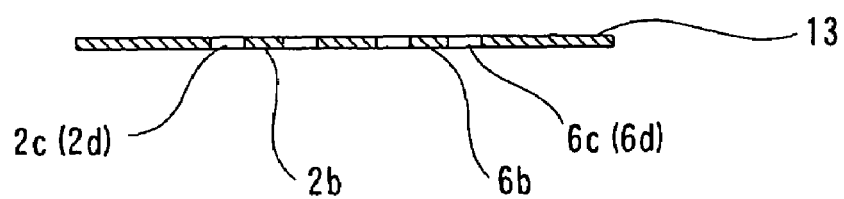
Figure 12A:
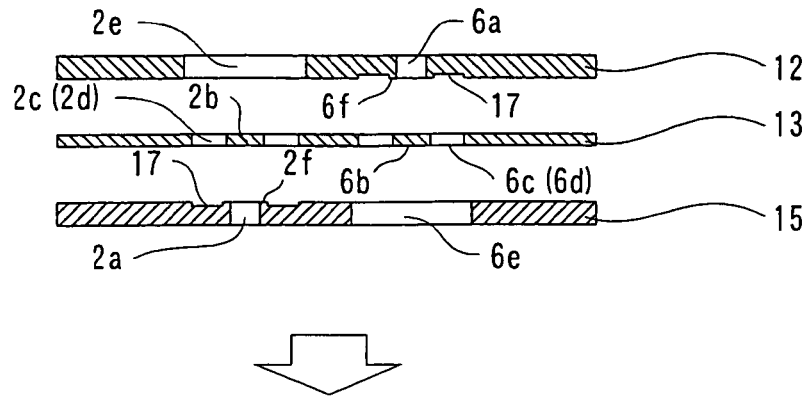
FIGS. 12A to 12C are cross sectional views respectively showing each step of a method of manufacturing a micropump check valve according to a fifth embodiment of the present invention, where
Figure 12B:
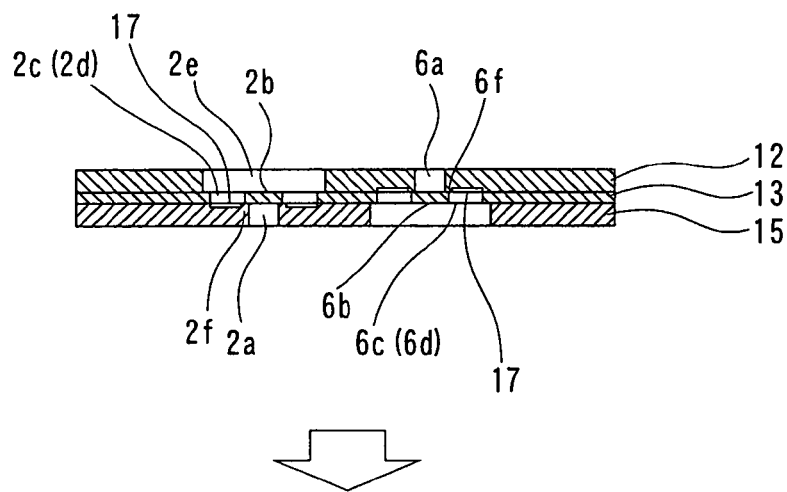
Figure 12C:
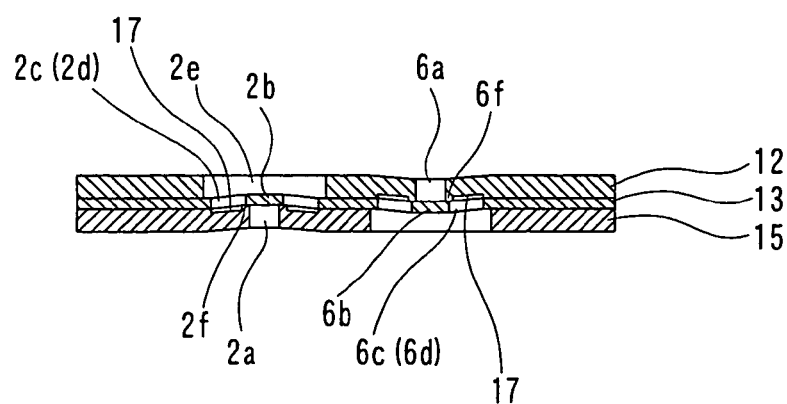
Figure 13A:
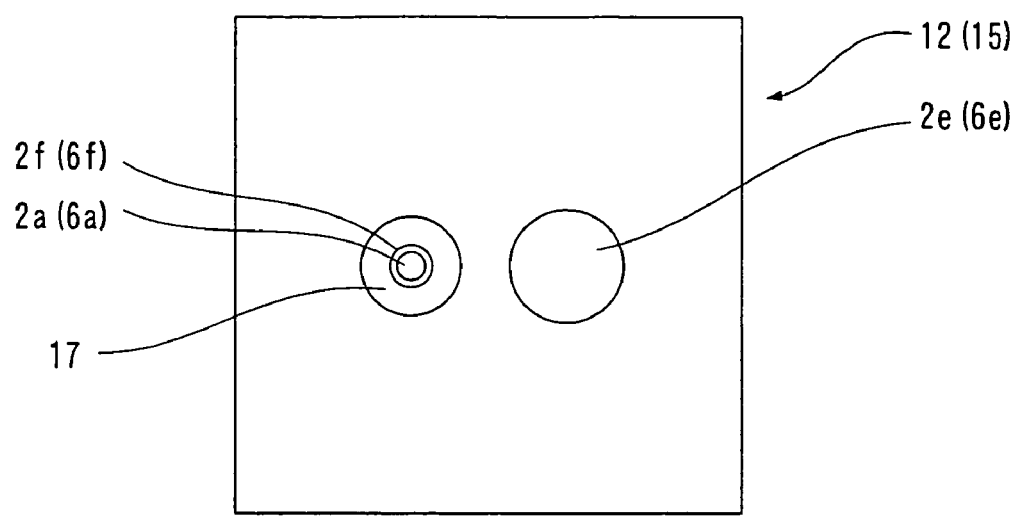
FIGS. 13A to 13D are plan views and cross sectional views respectively showing the plate material of the micropump check valve, where
Figure 13B:
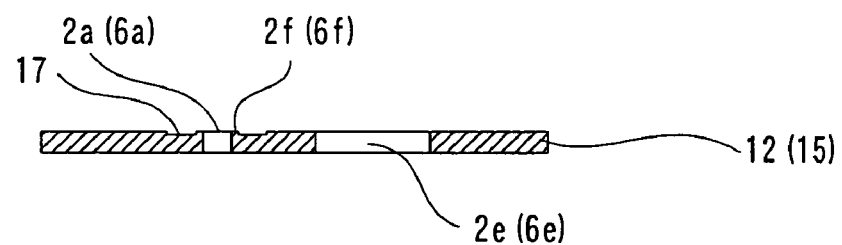
Figure 13C:
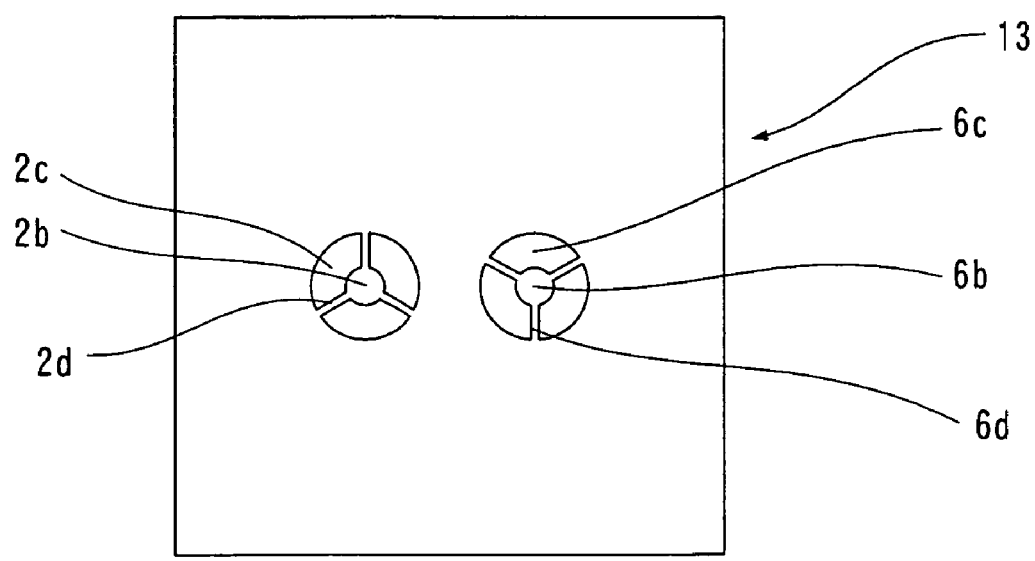
Figure 13D:
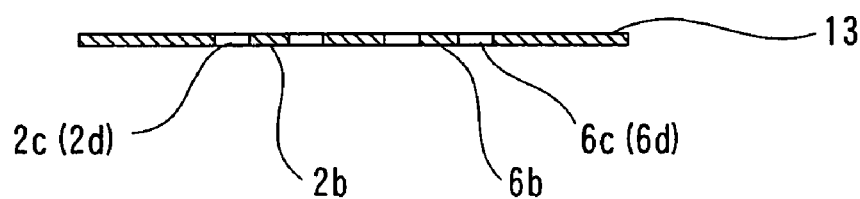

Further, FIG. 10 and FIG. 11 show a fourth embodiment of the present invention, and FIG. 12 and FIG. 13 show a fifth embodiment of the present invention.

As shown in FIG. 10 and FIG. 11, in the fourth embodiment, the check valves 2 and 6 are configured by five plate materials 11, 12, 13, 15 and 16, and the valve parts 2b and 6b, the supporting parts 2d and 6d of both check valves 2 and 6, and the passing hole 6c are formed on the third plate material 13 at the intermediate position.

As shown in FIG. 12 and FIG. 13, in the fifth embodiment, the check valves 2 and 6 are configured by three plate materials 12, 13 and 15, and the valve parts 2b and 6b, the supporting parts 2d and 6d of both check valves 2 and 6, and the passing hole 2c and 6c are formed on the third plate material 13 at the intermediate position.

In either the fourth or the fifth embodiment, the check valves 2 and 6 are satisfactorily manufactured by similarly laminating and bonding the above plate materials and then performing pressing, and the material cost is reduced and the time in the manufacturing process is shortened by decrease in the number of plate materials.

Figure 14A:
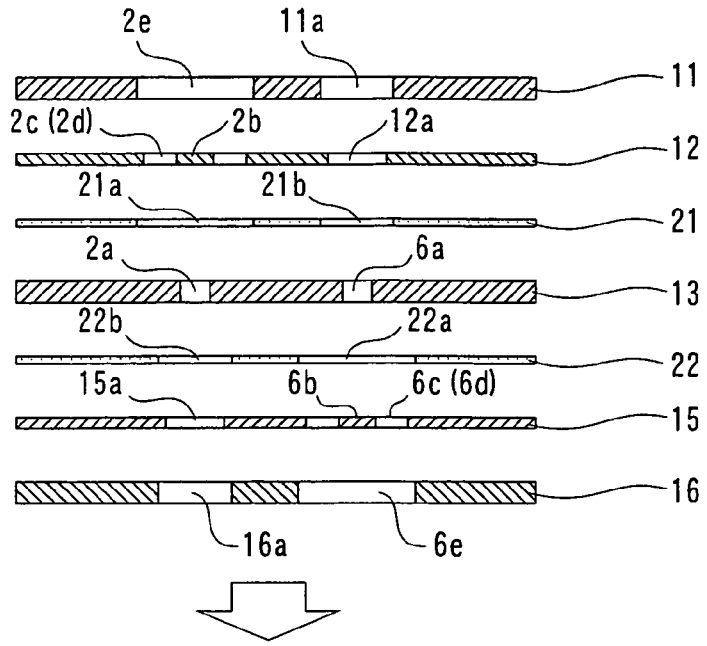
FIGS. 14A to 14C are cross sectional views respectively showing each step of a method of manufacturing a micropump check valve according to a sixth embodiment of the present invention, where
Figure 14B:
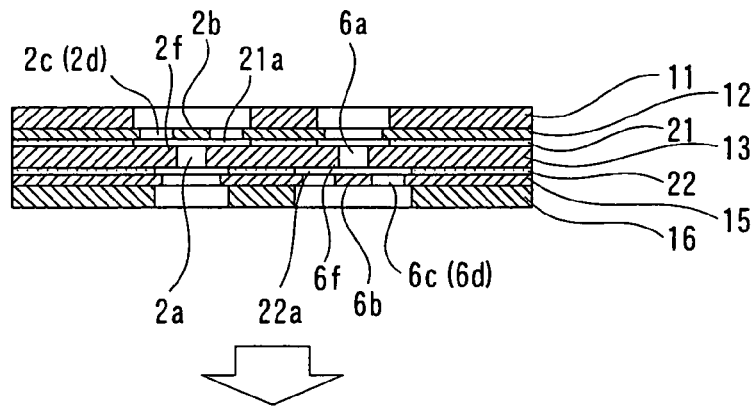
Figure 14C:
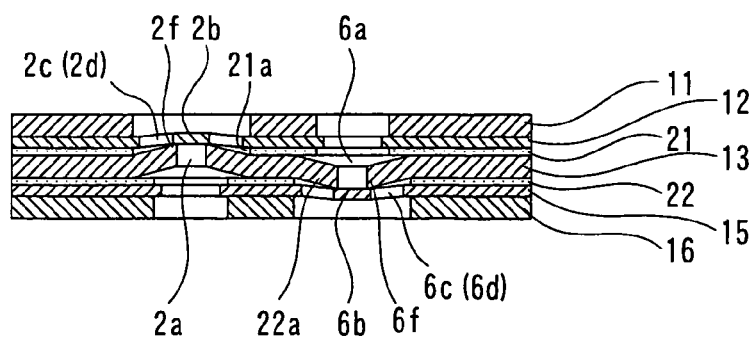

FIG. 14 shows a sixth embodiment of the present invention, and in the present embodiment, spacer materials 21 and 22 for producing a clearance between the valve forming material and the valve receiving member when the plate materials are laminated are interposed instead of providing the depression 17 by half etching and the like as in the second to the fifth embodiments. That is, in the embodiment shown in FIG. 14, the spacer materials 21 and 22 are interposed between the second and fifth plate materials 12 and 15 serving as the valve forming material formed with the valve parts 2b and 6b and the third plate material 13 serving as the valve receiving member when the plate materials are laminated, and the bonding is performed with the plate materials 11, 12, 13, 15, 16 in a laminated state. Therefore, when the bonding is performed, the valve parts 2b and 6b and the supporting parts 2d and 6d thereof of the second and the fifth plate materials 12, 15 spaced apart with respect to the third plate material 13 serving as the valve receiving member. Here, passing holes 21a and 22a for passing the fluid to the location corresponding to the valve parts 2b and 6b, the supporting parts 2d and 6d, and the passing holes 2c and 6c of the check valves 2 and 6 are formed in the spacer materials 21 and 22, and further, the passing holes 21b and 22b are also formed at the location corresponding to the inlet holes 2a and 6a.

As a result, during the bonding, the supporting parts 2d and 6d of the valve parts 2b and 6b are spaced apart from the external periphery location of the inlet holes 2a and 6a of the valve receiving member, and thus the fixing of such location is reliably prevented.

In the sixth embodiment, the check valves 2 and 6 of high reliability can be satisfactorily manufactured by similarly laminating and bonding the plate materials and then performing pressing process. Particularly in this embodiment, fixing of the valve parts 2b and 6b and the supporting parts 2d and 6d to the valve receiving member is reliably prevented without going through much trouble. That is, in the second to the fifth embodiments, half etching and the like is necessary to provide the depression 17, but in addition to requiring the half etching, alignment for forming the depression 17 by half etching must be extremely tightly performed, and in some cases, great amount of trouble and time may be required, or the yield may decrease, but by using the spacer materials 21 and 22 as above, only the alignment of when laminating the spacer materials 21 and 22 must be accurately performed, and there is no possibility of causing the above disadvantage.

Further, in the manufacturing method, the push-out amount of the third plate material 13 by the punch indenter 50 of the pressing device in the subsequent pressurizing must be the dimension of the thickness actually pushed out with respect to the valve parts 2b and 6b added with the thickness of the spacer material 21 (or spacer material 22). In this case, in case of the above first embodiment and the like, for example, of setting the projecting amount of the valve parts 2b and 6b by pressing process extremely small (e.g., 2 μm), even if the valve receiving material is projected at the plate material constituting the material thereof, such as stainless steel plate at a small projecting amount as above, the projecting amount cannot be obtained due to the elasticity of the plate material itself, and the projecting amount may be extremely small or actually may not project. On the contrary, when the spacer materials 21 and 22 are interposed as above, the spacer materials 21 and 22 having a thickness (e.g., 10 μm) suited to the dimension (e.g., 12 μm or more) to which the valve receiving material plastic deforms is used, and thus using such method, by moving the punch indenter 50 of the pressing device so that the valve receiving material (third plate material 13 in the present embodiment) deforms by a predetermined dimension (e.g., 12 μm), pretension is applied in a satisfactory state.

In the above embodiment, in any of the pressurizing, a case in which the valve receiving member is deformed by pressing process is mentioned, and according to such, an advantage of performing the process of applying pretension is carried out easily and satisfactorily. However, it is not limited thereto, and may be deformed by for example, laser processing.

In the above embodiment, a case of using the solid phase diffusion bonding method in the bonding is mentioned, but it is not limited thereto, and a liquid phase diffusion bonding method or a surface active bonding (cold bonding) may also be used.

For example, when the liquid phase diffusion bonding is used in the bonding, a bonding sheet material such as nickel is interposed on the bonding surface, and the materials to be bonded are bonded together, and as mentioned in the sixth embodiment, the bonding sheet material may also be used as the spacer material. The material of the bonding sheet material used in the liquid phase diffusion bonding method includes heat resistant material such as Ni-base. However, it is not limited thereto, and when using the Ni-base alloy (e.g., stainless material containing Ni) as the plate material ingredient for configuring the check valve, the Ni—B series may be used for the bonding sheet material, in which case of using the Ni—B series, the bonding temperature of stainless steel may be lowered.

When using the surface active bonding method (cold bonding) in the bonding, the surface of the member to be bonded is cleaned and planarized to atomic level, thereby allowing bonding at ambient temperature and without pressure, and bonding of different types of materials in principle, of all materials becomes possible.

Additionally, in the above embodiments, a case in which the material to be laminated is a stainless material is mentioned, but it is not limited thereto, and copper or titanium may be used for all the laminating materials, and in particular, when using a copper plate, an advantage of being able to bond satisfactorily through solid phase diffusion bonding method is achieved. However, other than the above, gold and copper (Au—Cu) may be used, stainless steel and copper may be used, or copper and aluminum (in this case liquid phase diffusion bonding must be performed using silver) may be used, but in this case, an attention must be given so as not to cause electrolytic etching between metals.

The micropump check valve according to the present invention has an effect of easily providing the function of urging force necessary in the valve mechanism without inhibiting the design of thinning the micropump, and is useful not only in a small apparatus for supplying small amounts of fluid used in a fuel cell, medical equipment, a chemical analyzer, a microreactor, a biochemical chip and the like, but also in apparatuses, requiring the check valve, for performing flow volume control with high accuracy in any of liquid, gas, or gas-liquid mixture.

What is claimed is:

1. A method of manufacturing a micropump check valve arranged in a flow path for permitting fluid flow therethrough by pressure change, the method comprising:
   forming a valve part and a valve-supporting part in a valve forming member;
   forming a flow path hole for such fluid in a valve receiving member including a valve receptor for receiving the valve part;
   bonding the valve forming member and the valve receiving member together, such that the valve part covers a flow path hole and is adjacent to and contacting the valve receptor, thereby closing the flow path hole; and
   after bonding, applying pressure to a side of the valve receptor opposite the valve part, thereby projecting the valve receptor towards the valve part and deforming the valve receiving member toward the valve part.

2. The method according to claim 1, wherein the valve forming member and the valve receiving member comprise the same material.

3. The method according to claim 1, wherein the valve forming member and the valve receiving member are bonded by solid phase diffusion bonding.

4. The method according to claim 1, wherein applying pressure to the valve receptor is performed by a pressing device.

5. The method according to claim 1, further comprising forming a depression on the valve receiving member in at least one of a location facing the supporting part of the valve part and a part of the valve receptor, so that at least one of the valve part and the supporting part is spaced apart from the valve receiving member during the bonding.

6. The method according to claim 1, further comprising placing a spacer material between the valve forming member and the valve receiving member, so that at least one of a part of the valve part and the supporting part of the valve part is spaced apart from the valve receiving member during the bonding.

* * * * *